US012743855B2

(12) United States Patent
Fischer et al.

(10) Patent No.: US 12,743,855 B2
(45) Date of Patent: Sep. 22, 2026

(54) VIRTUAL 3D-SCANNING ENVIRONMENT

(71) Applicant: HEXAGON INNOVATION HUB GMBH, Heerbrugg (CH)

(72) Inventors: Merlin Bastien Fischer, Bülach (CH); Susanna Nevalainen, Zürich (CH); Bruno Rocha Pereira, Sterrebeek (BE); Emanuele Di Ciommo, Zürich (CH)

(73) Assignee: HEXAGON INNOVATION HUB GMBH, Heerbrugg (CH)

(*) Notice: Subject to any disclaimer, the term of this patent is extended or adjusted under 35 U.S.C. 154(b) by 139 days.

(21) Appl. No.: 18/655,257

(22) Filed: May 4, 2024

(65) Prior Publication Data

US 2024/0371102 A1 Nov. 7, 2024

(30) Foreign Application Priority Data

May 5, 2023 (EP) .................................... 23171850

(51) Int. Cl.
*G06T 19/00* (2011.01)
*G01S 17/89* (2020.01)
*G06T 17/00* (2006.01)

(52) U.S. Cl.
CPC .............. *G06T 19/00* (2013.01); *G01S 17/89* (2013.01); *G06T 17/00* (2013.01); *G06T 2210/56* (2013.01); *G06T 2219/024* (2013.01)

(58) Field of Classification Search
CPC ..... G06T 19/00; G06T 17/00; G06T 2210/56; G06T 2219/024; G01S 7/51; G01C 15/002; G06F 3/011; G06V 20/20
See application file for complete search history.

(56) References Cited

U.S. PATENT DOCUMENTS 11,551,421 B1 * 1/2023 Bhushan ................. G06T 19/20
2009/0147319 A1 6/2009 Becker et al.
(Continued)

FOREIGN PATENT DOCUMENTS

DE 20 2006 005 643 U1 7/2006
EP 3 415 866 A1 12/2018
EP 4 141 473 A1 3/2023

OTHER PUBLICATIONS

Extended European Search Report dated Sep. 13, 2023 as received in Application No. 23171850.3.

*Primary Examiner* — Grace Q Li
(74) *Attorney, Agent, or Firm* — Maschoff Brennan

(57) ABSTRACT

A scanning method for 3D-laser scanning using a virtual reality scene for a remote operator wherein based on a virtual position of the user a scan region is automatically defined. The scan region is then scanned by a scanner, for example a robotic UGV-scanner, deployed in the environment. Scan data generated by the scanner is live streamed to the operator and displayed in real-time as a virtual reality 3D-view of the scanned scan region. Said 3D-view is further automatically dynamically updated in real-time based on generated and live-streamed additional scan data, whereby the additional scan data expands and/or refines the scanned scan region according to a further virtual position of the operator and/or according to an input, for example a manual definition of a region such as a scan gap to be additionally scanned, by the operator, using the displayed 3D-view within the virtual reality scene.

17 Claims, 6 Drawing Sheets

(56) References Cited

U.S. PATENT DOCUMENTS

| | | | | |
|---|---|---|---|---|
| 2010/0134596 | A1 | 6/2010 | Becker | |
| 2018/0165887 | A1* | 6/2018 | Iwai | A63F 13/86 |
| 2019/0107606 | A1* | 4/2019 | Russell | G01S 17/26 |
| 2021/0291242 | A1* | 9/2021 | Desrochers | B08B 15/023 |
| 2022/0100195 | A1* | 3/2022 | Zhang | G05D 1/0225 |
| 2022/0211533 | A1* | 7/2022 | Johnson | A61F 5/0125 |
| 2022/0358731 | A1 | 11/2022 | Kahle et al. | |
| 2023/0029105 | A1* | 1/2023 | Gomez | G01S 7/4813 |
| 2023/0395096 | A1* | 12/2023 | Kumar | G06V 20/40 |

* cited by examiner

VIRTUAL 3D-SCANNING ENVIRONMENT

BACKGROUND

The disclosure relates to a method and a system for a virtual environment for 3D-scanning of real-world data.

3D scanning is a very effective technology for producing millions of spatial measurement points of objects within minutes or seconds. Terrestrial laser scanning technology is used to collect static point cloud data of fixed non-moving man-made structures (such as buildings, construction sites, industrial plants) or scenes of non-moving man-made objects (e.g., crash sites). Typical measurement tasks are the recording of objects or the surfaces thereof such as industrial plants, house facades or historical buildings, but also accident sites and crime scenes. Surveying apparatuses with scanning or mobile mapping functionality are, for example, total stations and laser scanners, such as the Leica BLK2GO or BLK2FLY, Leica RTC360 or Leica Multi Station 50, which are used to measure or create 3D coordinates of surfaces. For this purpose, they have to be able to guide the measurement beam of a distance measuring device continuously over surfaces within a measurement space and in the process simultaneously to detect direction and distance with respect to the measurement point. From the distance and the direction information correlated therewith for each point, a so-called 3D point cloud is generated by means of data processing.

Such terrestrial measuring devices have for this purpose at least one radiation source for generating optical measuring radiation, often laser radiation, and optical means such as lenses, prisms, mirrors, light-guiding fibers, or collimators, by means of which the generated measuring radiation can be emitted in free space onto a target to be measured, because of which these devices are also referred to as so-called free beam sensors. Optical measuring radiation is understood in this case as electromagnetic radiation, not only in the visible range of the spectrum, but rather also radiation in the ultraviolet, infrared, and in the terahertz range.

In terms of the fundamental structure, such terrestrial laser scanners are thus designed to detect a distance to an object point as measurement point using a, usually electrooptical and laser-based, distance measuring device. A direction deflecting unit likewise present is in this case designed in such a way that the measurement beam of the distance measuring device is deflected in at least one spatial direction, often two perpendicular directions, as a result of which a spatial measurement region can be recorded. The scanning region in one direction, e.g., the horizontal is here frequently 360°, i.e., one full circle, and in the other direction, e.g., the vertical for example 180°, with the result that at least one hemisphere is covered, which together with the maximal measurement distance define the measurement space. The deflecting unit can be realized in the form of a moving mirror or alternatively also by other elements suitable for controlled angular deflection of optical radiation, such as, for example, rotatable prisms, movable optical waveguides, deformable optical components, etc. The measurement is usually affected with determination of distance and angles, that is to say in spherical coordinates, which can also be transformed into Cartesian coordinates for display and further processing. The distance measuring device can be embodied for example according to the principles of time of flight (TOF), phase, waveform digitizer (WFD) or interferometric measurement. For fast and accurate scanners, in particular a short measurement time in conjunction with high measurement accuracy is required, for example a distance accuracy in the mm range or below with measurement times of the individual points in the sub-microseconds to milliseconds range. In this case, the measurement region ranges from a few centimeters up to a few kilometers.

Terrestrial surveying instruments for scanning of object surfaces may be stationary. For example, they are stationed by a tripod in an environment such as room or near an object such as a workpiece to be scanned and thereof, the target is measured. Hence, for these devices, a fixed setup point is selected, which serves as a basis for a scanning process effected by motors such that the recording or scanning location (as position of the scanning unit relative to the scanned object) therefore remains unchanged during the scanning. The three-dimensional spatial information of the respective surface point is derivable by way of the distance to the measured point, the angle position at the time of the measurement and the known location of the apparatus. For additional information, the laser scanner data may be combined with camera data, in particular to provide high-resolution spectral information, e.g. by means of an RGB camera or an infrared camera. Some embodiments of stationary laser scanners can for example be found in DE 20 2006 005643 U1, US 2009/147319 or others.

However, acquiring the 3D data can be cumbersome and, in some cases, even dangerous for a human worker. Often, access to a specific area is prohibited or severely restricted for a human user or operator. That is one reason why, as an alternative to scanners operated in the field by a human being, in particular above-mentioned stationary scanners, scanning instruments may be provided by a mobile robot. The robots is configured to move through the environment and often provides perception data and referencing data at the same time, e.g. wherein at least trajectory data of the robot are provided with the acquisition of the perception data, such that perception data acquired at different positions can be combined into a common coordinate system, e.g. in form of point cloud registration. Often, such mobile robots are configured to autonomously create a 3D map of a new environment, e.g., by means of simultaneous localization and mapping (SLAM) functionality.

Such robotic vehicles, particularly autonomous robotic vehicles, are increasingly used to facilitate data acquisition and to reduce risks on human workers. 3D surveying devices used in combination with such robotic vehicles are typically configured to provide surveying data during movement of the robotic vehicle, wherein referencing data provide information on a trajectory of a data acquisition unit, e.g. position and/or pose data, such that surveying data acquired from different positions of the data acquisition unit can be combined into a common coordinate system.

Many different types of autonomous robotic vehicles are known. For example, ground based robotic vehicles may have a plurality of wheels for propelling the robot, typically having sophisticated suspension to cope with different kinds of terrain. Another widely used type is a legged robot, e.g., a four-legged robot, which is often able to handle tough terrain and steep inclines. Aerial robotic vehicles, e.g., quadcopter drones, allow further versatility to survey areas that are difficult to access, but often to the expense of less surveying time and/or sensor complexity due to limited load capacity and battery power.

Unmanned Arial Vehicles (UAV) and Unmanned Ground Vehicles (UGV) are for themselves state-of-the-art platforms for multilateral use. Equipped with imaging and lidar sensors, these platforms provide for autonomous path planning and for autonomously moving an acquisition unit for acquiring 3D surveying and reality capture data.

The combination of multiple autonomous robotic vehicles provides flexibility in surveying large and varied areas, e.g. measurements from the ground and from the near air, etc. Each mobile surveying device may provide 3D surveying data. By way of example, from each measurement location a surveying device generates a so-called local 3D point cloud providing multiple measurement points referenced to a common coordinate system relative to the surveying device. When moving the surveying device, the local point clouds determined in different locations of the surveying device have to be related to each other by referencing, point cloud registration, point set registration, or scan matching in order to form a so-called 3D survey point cloud of the respective surveying device. In addition, the 3D survey point clouds from different surveying devices located on different autonomous robotic vehicles have to be referenced to each other in order to form a so-called "combined" 3D survey point cloud.

For referencing local point clouds of the same surveying device, often additional information such as data from an inertial measurement unit and a SLAM unit provided by the surveying device are used.

The spatial measurement resolution is of particular importance. It determines what details can still be identified, but also the duration of the scanning process and the volume of data obtained in the process. Measurement projects with modern high-speed scanners produce 3D point clouds having a cardinality of, for example, hundreds of millions or billions of object points and beyond. The storage, transmission and processing of the enormous volume of data associated therewith poses great challenges for hardware and software. For example, the execution speed of programs for evaluating the 3D data is greatly dependent on the number of scanning points.

Given the large amount of data and the different kinds of data, data acquisition, data handling, and selection of relevant data may be cumbersome and, for example, require long user experience. Different kinds of user may have different requirements or prerequisites regarding data quality and accuracy, data storage and computing power, and 3D model visualization. Often sophisticated software and an advanced skill level of the user is required to provide acquisition and processing of scan data with sufficient quality.

By way of example, three-dimensional scanning is used to assess an actual condition of an area of interest, e.g., a restricted or dangerous area such as a construction site, an industrial plant, a business complex, or any other facility or building. The outcome of the 3D surveying may be used to efficiently plan next work steps or appropriate actions to react on a determined actual condition. Decision making and planning of work steps can be further aided by means of a dedicated digital visualization of the actual state, e.g., in the form of a combined point cloud or a vector file model. It is also known to use means of an augmented reality (AR) functionality for visualizing 3D surveying data, e.g., by EP 3415866 A1.

However, known 3D-scanning systems and methods of the state of the art do not adequately provide means for efficiently and dynamically managing a scanning procedure, in particular for collaborative workflows or parallel scanning with multiple scanners.

SUMMARY

It is therefore an object to provide a system and a method for improving 3D-scanning of an environment.

A further object to provide a system and a method for enabling efficient collaborative 3D-scanning of an environment.

The disclosure relates to a scanning method for 3D-laser scanning of a real-world environment. The method comprises the steps of providing a virtual reality scene to a first remote user or operator visualizing at least a first part of the environment, automatically determining a first virtual position of the first user or operator within the environment, in particular using a position of a user's avatar in the virtual reality scene and automatically defining a first scan region as a region to be scanned based on said first virtual position.

The method further comprises automatically transmitting instructions to a, in particular mobile, first scanner deployed in the environment to scan said first scan region and live-streaming scan data, in particular 3D-point cloud data, of the first scan region, generated by the first scanner, to the operator and displaying in real-time a virtual reality 3D-view, e.g. a 3D digital model or a textured point cloud or mesh, of at least part of the environment comprising the scanned first scan region to the first user based on the streamed scan data.

Further, there is an automatic dynamic updating of said 3D-model in real-time based on live-streamed new or additional scan data of the environment, generated by the first scanner and/or another scanner. The additional scan data expands and/or refines the scanned first scan region according to a further virtual position of the first user, in particular with a continuous automatic tracking of the first user's position and according to continuous automatic expanding and/or refining of the first scan region. Alternatively, or additionally, the whereby the additional scan data expands and/or refines the scanned scan region according to an input such as a manual definition of a region to be additionally scanned by the first user within the virtual reality scene using the displayed 3D-view.

As an option, the method comprises providing a virtual reality scene to at least a second remote user or operator representing at least a second part of the environment, automatically determining at least a second virtual position of the second user within the environment, in particular using a position of a user's avatar in the virtual reality scene and automatically defining the first scan region based on a geometric relation of said first and second virtual position.

Optionally, the scan region is defined based on an area or volume of defined size with the virtual position as anchor point, in particular as a central point.

As still another option, technical capabilities of the deployed scanner designated for scanning the scan region and/or user access rights to the environment and/or a manual user input is taken into account for defining the size of the area or volume.

As another option, the first scan region is defined based on an overlap of the areas or volumes defined for the first and the second user; or in case no such overlap exists, separate scan regions are defined for each user.

As still another option, the method comprises, in case multiple scan regions are defined, automatically prioritizing one of the first or second scan regions for scanning according to the number of users associated therewith.

Optionally, said additional scan data is generated for refining a region having a scan resolution below a desired scan resolution, in particular for filling a scan gap.

As another option, a user's viewing direction is automatically determined and taken into account in the automatic defining of the scan region.

Optionally, the method comprises selection of significant points of scanned objects of the scan region within the scan data, e.g., by point quality evaluation, scan distance consideration, usability for meshing, feature recognition, object information gain contribution, relevancy considering a viewpoint of the user or other point classification criteria, which significant points are automatically prioritized for streaming.

As another option, at least a second scanner is deployed in the environment and for said automatically transmitting of scan instructions, location in the environment and/or capabilities of a respective scanner is automatically taken into account for automatically choosing the scanner that is best suitable for the scanning of the first scan region. Thereby, as a further option, the scan region is automatically divided into sub-scan regions for automatic parallel scanning with multiple scanners, scanning simultaneously sub-scan regions of the scan region, according to the number and capabilities of available scanners.

As a further option for multiple users, generating and live-streaming of scan data is prioritized to generating and live-streaming of additional scan data at least until a virtual reality 3D-model comprising the first scan region is provided to every user, in particular in case the number of available scanners is lower than the number of users.

The present disclosure relates also to a system for remote 3D-laser scanning of an environment, the system comprising a virtual reality display for displaying virtual reality to at least a first remote user, at least a first scanner deployed in the environment, a control and evaluation computing unit and a data connection for data transmission between the virtual reality display, the first scanner and the control and evaluation computing unit.

The control and evaluation computing unit is configured to provide a virtual reality scene to the first user representing at least a first part of the environment, determine a first virtual position of the first user within the environment, in particular using a position of a user's avatar in the virtual reality scene, define a scan region based on said first virtual position, transmit instructions to the first scanner to scan said scan region and live-stream scan data, in particular 3D-point cloud data, of the scan region, generated by the first scanner, to the user and display in real-time a virtual reality 3D-view of at least part of the environment comprising the scanned scan region to the first user based on the streamed scan data.

The control and evaluation computing unit is further configured to dynamically update said 3D-view in real-time based on generated and live-streamed additional scan data of the environment, whereby the additional scan data expands and/or refines the scanned first scan region according to a further virtual position of the first user, in particular with a continuous automatic tracking of the first user's position and according continuous automatic expanding and/or refining of the first scan region, and/or according to an input, in particular a manual definition of a region to be additionally scanned, by the first user using the displayed model within the virtual reality scene.

The present disclosure also relates to a computer program product comprising program code which is stored on a machine-readable medium or being embodied by an electromagnetic wave comprising a program code segment and having computer-executable instructions for performing the claimed method, particularly when executed on a control and evaluation computing unit of a system as claimed.

The present system and method advantageously enable incremental, iterative displaying in a VR-environment of the digital 3D output of an ongoing scan of a real-world scene or objects as well as actionable and automated communication between the viewer of the scan and the scanner operator or robotic scanning device. The disclosure enables collaborative and live visualization of scanning results as a virtual reality, i.e., remote collaboration for scanning 3D assets in real-time conditions.

For example, a human quality assurance inspector operating remotely in virtual reality and controlling if a complete scan is provided—for optimal meshing and coverage—can without delay select an area that is of lesser quality or not well scanned to be rescanned in more detail for best results which prevents a later rescan with redeployment of scanners which is time consuming and expensive.

After scans are eventually finished or even during an ongoing first scan, users can keep visualizing the scanning result and request parts of the virtual asset to be scanned again by second scans, e.g., with different precision settings.

Thereby, received scan data can be attached to a dynamic scan file, which then gets processed to a dynamic mesh. A remote user then can visualize the current scan as a point cloud and/or a mesh, which can get updated when the scanning device uploads new data.

The present disclosure can be used in various domains for different use cases, for example in the domain of architecture and construction, remote scanning and live data sharing can enable the different actors to collaborate from various parts of the world while having a high-quality digital twin made available to them, e.g., for regular inspections. As another example, in dangerous zones, where remotely controlled sensors are used, it is essential to have direct feedback on the scanning progress and not to miss any parts of the asset. Access to the scanning zone can be time-restricted and potentially dangerous. The disclosure gives remote operators a live visual tool to guarantee the completeness of the scan in real time and avoids having to access the area of interest, also avoiding later appointments to scan missing parts.

The present disclosure offers an accurate real-world based point cloud and mesh visualization platform where multiple users or operators can interact simultaneously with each other and their environment dynamically simulated on basis of the scanned object data. Multiple users can remotely virtually access the scanned site, e.g., a plant, and interact with each other and the virtual 3D-visualization in real time whereby other users can see changes other users initiate or make instantly. Operators can place, for example virtual objects or other reality captured data into a scene, thus opening more cost-efficient opportunities for planning before a construction has even started. Some onsite work can be replaced completely by remote work or collaboration, avoiding unnecessary travel and saving time.

BRIEF DESCRIPTION OF THE DRAWINGS

Devices, methods, systems, setups and computer programs are described or explained in more detail below, purely by way of example, with reference to working examples shown schematically in the drawing.

Specifically.

DETAILED DESCRIPTION

Figure 1:
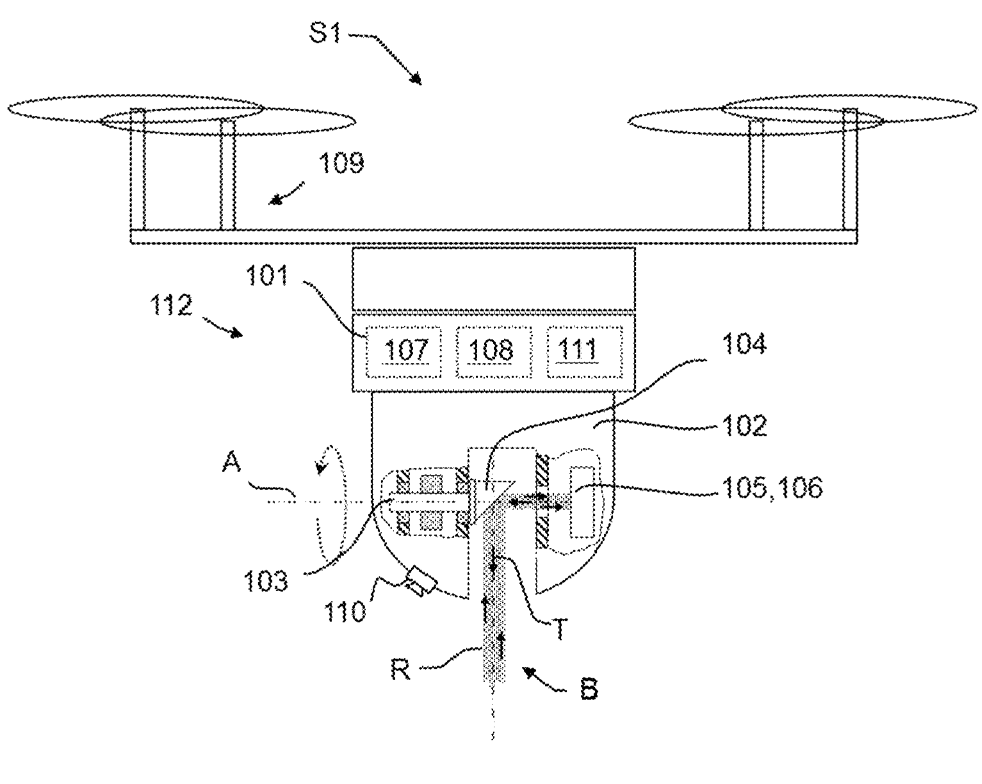
FIG. 1 shows an embodiment of a robotic scanner.

FIG. 1 shows an embodiment of a robotic scanner S1 which can be used as part of the inventive scanning system resp. scanning method. In the example, the scanner S1 is embodied as a flying scanner. The scanner comprises an unmanned aerial vehicle (UAV) 109 and a profiler 112, which is adapted to be mounted on the UAV (however, in the following, "UAV" is also sometimes used as meaning the complete flying scanner S1). The profiler 112 is configured for operation during a flight of the UAV 109.

The profiler 112 has a base 101 and a scanning unit 102, which are shown in FIG. 1 as being separate elements. In another embodiment, the base 101 can also be understood as the upper/lower part of the scanning unit 102, such that the profiler 112 and the scanning unit 102 by definition of this application are one structural element. Either way, the base 101 is designed for being attachable to the UAV 109. That could be achieved, for example, by a snap-in construction, or mounting elements like screws, clamps or straps. The base 101 may comprise a battery for energy supply, or the base 101 may be connected to the UAV 109 via an electrical port to obtain electric power from a battery of the UAV, or the base 101 may comprise a battery for energy supply and may be connected to the UAV 109 via an electrical port to provide electric power to a battery of the UAV 109. By said port, also information may be exchanged, e.g., acceleration data, height data, position data or tilt data.

The profiler, in particular the body 101 (as is exemplarily shown in FIG. 1) or alternatively the scanning unit 102, comprises a computer 107, a pose sensor 108 and optionally a wireless communication unit 111. The pose sensor 108 comprises an Inertial Measuring Unit (IMU) and a Global Navigation Satellite System (GNSS) sensor, which may also be a Pseudo-GNSS sensor for application of the flying sensor in a tunnel where satellite signals cannot be received directly. The pose sensor 108 is configured to measure the position and orientation of the flying sensor.

The scanning unit 102 comprises a motorised shaft 103 which is mounted and motorised, so that it can be rotated under control of the computer 107 about the axis of rotation A. A beam deflection unit (deflector, mirror) 104 is attached to the shaft 103, and is—in the shown embodiment—protruding out of the scanning unit 102. The shown slit of the scanning unit 102 may be sealed by a transparent hood window comprised by the scanning unit 102. Instead of only one deflection axis A as shown, such a scanning device may provide a second deflection axis for two-axis deflection of the scanning beam (so called two-axis laser scanner). In particular, the second axis is perpendicular to the first one and/or one axis is a "slow" rotation axis compared to other, "fast" one.

The scanning unit 102 furthermore comprises a first transmitter 105 and a first receiver 106, which are both shown in FIG. 1 as being in one box. The transmitter 105 and the receiver 106 may, however, also be embodied as two separate units, e.g., wherein the transmission beam T and the reception beam R are separated by a beam splitter, which is known in the art.

Generated transmission beams T are directed at the deflector 104 which deflects the transmission beams T outwards towards the environment. The reflected transmission beams T come back from an object of the environment (by reflection from a surface of the object) as reception beams R and are deflected by the deflector 104 "back" towards the beam receiver 106. Both transmission and reception beam can be summarized as measurement beam B.

For instance, by a time-of-flight measuring principle, a plurality of points is measured by scanning beam B. With the distance to the points and the angle of the shaft under which they were measured, LiDAR data are generated by the scanning unit 102, which is also referred to as main scanning unit herein. For continuously tracking the angle measurement, the rotation of the shaft 103 is sensed by an angle encoder or e.g., by monitoring the voltage of the motor of the shaft via a hall sensor.

In a further embodiment, the base 101 and the scanning unit 102 may be rotatable relative to each other. For this, either the base 101 or the scanning unit 102 may comprise a motor (and optionally a gearing) to perform such a relative rotation. The rotation may be controlled by the computer 107, and may e.g., be dependent on a current flight path.

The profiler S1 further has a visual sensor comprising a camera 110 which may be arranged on the scanning unit 102 (as shown), on the base 101 or on the UAV 109. The at least one camera has a defined position and defined orientation relative to the point of origin (nodal point) of the profiler.

The data gathered by the visual sensor are one input for a Simultaneous Localisation and Mapping (SLAM) algorithm (process) performed by the computer 107. The other inputs are data gathered by the pose sensor 108 and the LiDAR data gathered by the scanning unit 102. In a combined SLAM process, a 3D point cloud P of the setting is built up. In particular, the pose data measured by the pose sensor and the visual data of the visual sensor are helping to store the LiDAR points in a correct spatial correlation.

With means of the visual data of the camera 110, the gathered 3D point cloud P may furthermore be colored or "coated" with texture that has been captured from the topography. Device S1 may comprise other sensors such as thermometer or IR-sensor, too, for measuring an object temperature or thermal image.

Figure 2:
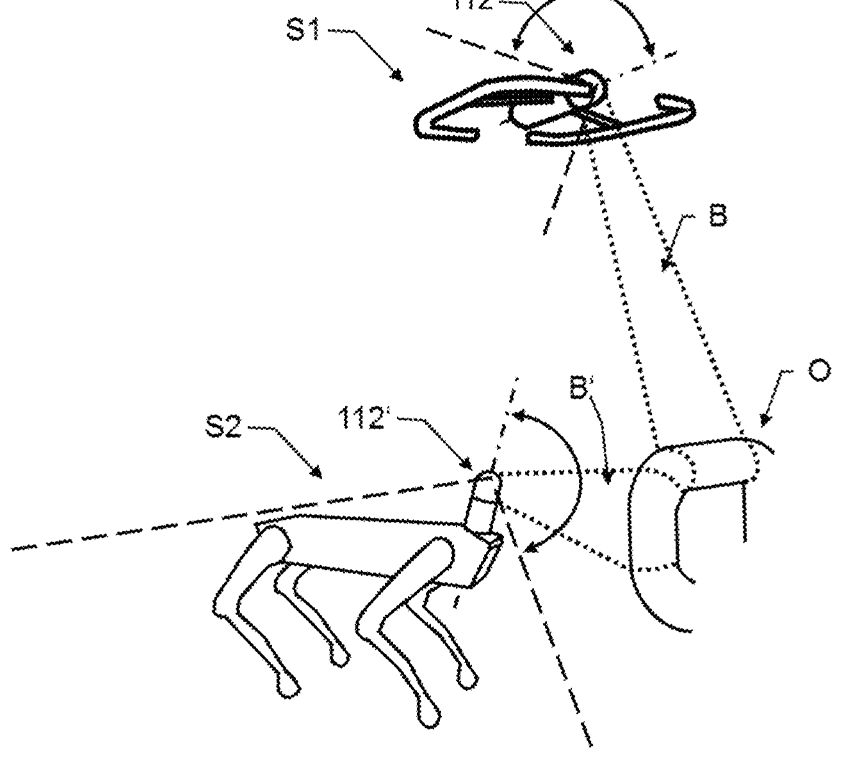
FIG. 2 depicts an exemplary measurement scenario with multiple robotic scanners.

FIG. 2 depicts an exemplary measurement scenario, wherein multiple surveying devices S1, S2 are used to generate scan data of an environment in order to determine a digital 3D-representation of the environment.

By way of example, one surveying device S2 comprises an unmanned ground vehicle (UGV) and works together with a further surveying device S1 comprising on an unmanned aerial vehicle (UAV). Each of the UGV S2 and the UAV S1 is equipped with a lidar device 112', 112, emitting a measurement beam such as a laser beam, and being e.g., embodied as a profiler as described with regard to FIG. 1.

Here, the robotic ground vehicle S2 is embodied as a four-legged robot. For example, such robots are often used in unknown terrain with different surface properties having debris and steep inclines. The ground robot S2 has sensors and processing capabilities to provide for SLAM, which comprises reception of perception data providing a representation of the surroundings of the autonomous ground robot S2 at a current position, use of the perception data to generate a map of the environment, and determination of a trajectory of a path that the ground robot S2 has passed within the map of the environment.

The aerial vehicle S1 is e.g., embodied as quadcopter drone, which allows further versatility to survey areas that are difficult or impossible to access by the robotic ground vehicle S2. Similarly to the UGV S2 and as already discussed above, the aerial vehicle S1 has sensors and processing capabilities to provide for SLAM, too, which comprises reception of perception data providing a representation of the surroundings of the unmanned aerial vehicle S1 at a current position, use of the perception data to generate a map of the environment, and determination of a trajectory of a path that the aerial vehicle S1 has passed within the map of the environment.

For example, each of the lidar devices 112, 112' has a field-of-view of 360 degrees about a so-called slow axis and a so-called band field-of-view of at least 130 degrees about a fast axis. Both lidar devices 112, 112' are each configured to generate the corresponding lidar data with a point acquisition rate of for example at least 300'000 points per second. For example, the lidar devices 112, 112' are each embodied as two-axis laser scanner, wherein in case of the lidar device 112' on the UGV, the fast axis is essentially aligned vertical and in case of the lidar device 112 on the UAV, the fast axis is essentially aligned horizontal.

By way of example, the SLAM units of the UGV S2 and the UAV S1 respectively, are configured to receive the corresponding lidar data as the perception data, which, for example, provides improved field-of-view and viewing distance and thus improved larger scale path determination. For example, this is particularly beneficial for exploring unknown terrain. Another benefit comes with the all-around horizontal field-of-view about the slow axis and the band field-of-view about the fast axis. In case of the UGV S2 this provides the capability to essentially cover the front, the back, and the ground at the same time, wherein in case of the UAV S1 this provides the capability to essentially cover the back and the ground at the same time.

By way of example, the scan data generated by means of the UGV S2 can be combined for gap-filling of complimentary system data. Typically, the UGV lidar device S2 "sees" objects close to the ground and in a side perspective (facades, soffit, etc.) and is used for indoor surveying (buildings, tunnels, etc.). The UAV S1 observes objects above ground (upper-level facades, roof, etc.) and is often used for outdoor surveying (buildings, bridges, etc.). In the figure, both the UAV lidar device 112 and the UGV lidar device 112' are exemplarily used to coordinatively measure an object O, e.g., a pipe, e.g., on a power plant site, wherein the UAV lidar device 112 predominantly observes the top part of the object O and the UGV lidar device 112' only observes the object O from a side perspective.

The combination of a UGV S2 and a UAV S1 further allows to carry out a scan area definition for the scanning device 112' on the UGV S2 by means of an exploration or scouting flight of the UAV S1. By the exploration flight which may have a relatively low measurement accuracy or resolution, a region of interest to be surveyed by the UGV S2 is defined. For example, the UAV S1 provides for generation of an overview or preview of path where UGV S2 is following. Spatial anchoring (re-localization) allows matching of the UGV lidar data and the UAV lidar data and trajectory alignment for line-of-sight environments.

The exploration by the UAV S1 also allows to estimate if a particular measurement goal can be reached with constraints, e.g., providing for an improved estimate whether the battery of the UAV S1 or the UGV S2 is enough to fulfill a foreseen task and accordingly distribute scan tasks. Since battery power of a UAV S1 is typically limited, the UGV S2 may further be configured as landing/docking station for the UAV S1 and as a moving charging station for the UAV S1. This way the reach by the UAV S1 can be extended by re-charging, e.g., during periods where only surveying by the UGV lidar device 112' is required, e.g., when stepping in an indoor environment. Similarly, heavy data streaming may be carried out in a docked state of the UAV S1 on the UGV S2.

FIGS. **3*a*-3*g* schematically depict an example of a scanning method making use of scanning robots S1, S2 as exemplified above as well as using a virtual reality environment. Virtual reality technology allows a user 10 to "experience" an immersive virtual reality world 1*v* that is distinct from environments in which the user 10 is located in the real world. A user 10 using a virtual reality device 3 such as VR-googles may look around a virtual reality world 1*v* in any direction (e.g., forward, backward, left, right, up, down), move a virtual viewpoint (e.g., a virtual avatar) around within the immersive virtual reality world 1*v*, interact with virtual representations of people and/or objects 5*v*, 6*v* included within the immersive virtual reality world 1*v*, and so forth. Depending on the used hardware or display technologies, virtual reality content presented to the user 10 may give him a sense that he is actually present in and experiencing the immersive virtual reality world 1*v* thus surrogating the real-world environment in which the user 10** is actually located.

Figures 3A, 3B:
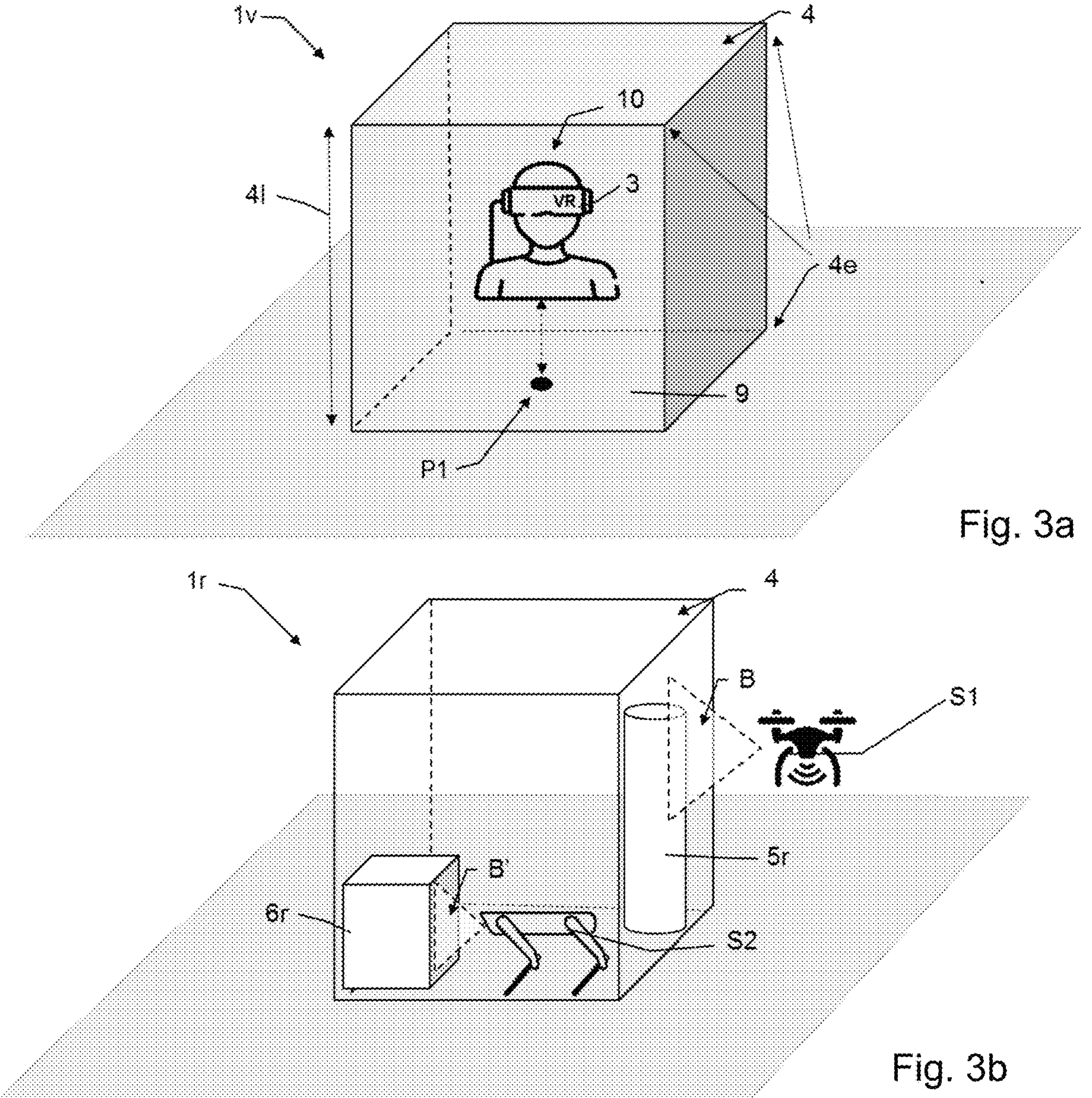
FIGS. 3*a-g* schematically depict an example of a scanning method with a scanning system comprising a virtual reality environment.

In the example depicted in FIG. **3*a*, the operator resp. a operator's avatar 10 is placed by using a VR-device 3 in a virtual reality environment 1*v* emulating a real-world scanning environment (denoted 1*r*, see e.g., FIG. 3*b*). At the beginning of the scanning procedure, the virtual environment 1*v* may be sort of empty, e.g., just showing a flat ground floor as depicted in the figure without any objects, or be a or show standard placeholders, e.g., a "dummy" room or outdoor environment with standardized elements or objects. Additionally or alternatively, the start virtual reality scene 1*v* may visualize information or objects already known from the real scene which is to be simulated, e.g. based on prior generated scanning data, e.g. a previous surveying or a quick pre-scanning such as a 2D-profiling by an operator freely scouting the environment, or data of a plan of the environment, e.g. a digital building plan with nominal building data, which is visualized in the VR-scene, e.g. in form of visual markers, geometric lines or shapes representing nominal boundaries or limits of a room or the like. Thus, the user 10 may be given some visual aids which indicate at least a rough current virtual location P1** in the scanning environment.

In any case, the virtual environment **1*v* is linked by a position or dimension to the real environment 1*r* such that a virtual position P1 assigned to the user 10 can be located in the real world or referenced to a position in the real world. For example, an available model of the environment to be scanned or part of it, e.g. derived from a previous scan or a digital model such as a BIM (building information model) or digital (2D) map, is used as basis for the virtual environment 1*v* and the user's position P1 is automatically set at a prominent location within the model, e.g. building entrance or center of a space such as a room. Otherwise, the user 10 may set his virtual location P1 manually. Or a previous position of him is used, e.g., his stored last position when leaving the virtual scene 1*v*** in a previous session.

As still another option, the user's position P1 is set in dependence on a position of a scanner S1, S2 (see FIG. **3*b*) to be used in the real world, e.g., the user's position P1 is assumed to be next to the scanner S1 or S2. The user's virtual starting position P1** may depend on his position in its real surrounding, e.g. determined or tracked by a positional sensing device of the VR-hardware system as in principle known in the art, e.g. using gyroscopes, dead reckoning, (LED-)pattern recognition, camera image based tracking, e.g. using SLAM-algorithms or systems based on reference markers or base stations, e.g. using IR-reference light.

Based on the position P1 of the user resp. of the user's virtual avatar, a scan region to be scanned is automatically defined. As exemplified in FIG. 3*a*, the position P1 is regarded as an anchor point or point of origin, e.g. as a midpoint or central point around which a volume 4 is defined, in the example a cube with a defined edge length 4*l* or with defined edge points 4*e*. Said otherwise, a scan volume is defined in the virtual environment 1*v* with the user 10 in the center.

The scan region to be measured can also be defined as any other form, e.g., a (half-)sphere or a bottom area 9. Also, it does not need to be centered around the user's position P1. For instance, the cube 4 is defined also taking a user's viewing direction into account, e.g., in such a way that the position P1 is at the rear bottom edge or rear side of the cube 4, the volume 4 lying in front of the user 10.

Also, operator 10 might manually correct or rearrange an automatically generated draft or "proposal" for a scan region 4. For example, user 10 might modify the automatically suggested cube 4 by shifting or rearranging one or more of the edge points 4*e* or "drawing" of boundary lines. Thus, if for example the virtual environment 1*v* indicates different rooms or room sections of derived from a floor plan, user 10 can for instance exclude one or more rooms or room sections which are of no interest for him. A user's interest might also be automatically taken into account when establishing the region 4 to be scanned e.g., by indication of his function or profession to the system when logging in, e.g., customer, vender, architect or engineer. That is, the automatic definition of the scan region 4 can differ depending on the user's role.

As indicated in FIG. 3*b*, the data in form of coordinates or the like specifying the scan region 4 to be scanned, defined as explained above, is transmitted, e.g., by WLAN or via Internet, to laser scanner S1, S2 which are situated in the real-world counterpart 1*r* of the virtual environment 1*v* shown in FIG. 3*a*. The laser scanners S1, S2 are in the example embodied as a UAV S1 and a UGV S2 as described in more detail in context of FIGS. 1, 2, but can also comprise other types of scanners such as stationary ones.

The volume 4 to be scanned is automatically divided between the available scan robots S1, S2, whereby their capabilities and/or location in the environment 1*r* are taken into account. For example, the UAV S1 is ordered to scan (substantially) the upper half of volume 4 and UGV S2 (substantially) the bottom half, whereby the scan subregions are defined in such a way that partial overlaps of the scan subregions result, for enabling registration of the respective point clouds of scanners S1 and S2 as in principle known in the art.

The capabilities of available scanners S1, S2 can also be taken into account when defining the scan region 4 as a whole, e.g., the more scanners S1, S2 are available the bigger the scan region 4 can be set. Another parameter which could be taken into account when setting the scan region 4 can for instance be user access rights, that is regions which the user 10 is not allowed to see or virtually access is not included in a scan region 4 at the outset.

The scan task may be associated with providing a particular level of detail of the scan data to be generated. The scan task may also be typical for providing data of two particular surveying devices S1, S2 working together to fuse different data types, e.g. to gain information content such as geometrical information combined with a color or temperature information of objects 5*r*, 6*r* within the environment 1*r*. Based on the scan task, the scanning system may automatically recognize a target quality to be achieved, e.g. a minimal overall point density or a minimal signal-to-noise in the coordinate measuring data.

In the FIG. 3*b*, only two objects 5*r*, 6*r* are depicted as examples for object surfaces to be scanned in the defined scanning region 4 for sake of clarity of the figures but of course the scanning is not limited to a certain number of objects or such dedicated objects 5*r*, 6*r* at all but can comprise all surfaces within the set volume 4. Also, the number of laser scanners is not limited to two but limited only for reasons of clarity.

In the example, the automatically separation of the scan region 4 in two subregions for scanners S1 and S2 unintentionally has the result, that the upper surface of object cube 6*r* is not scanned as it is above the scanning field of the UGV S2 and not within the upper subregion for UAV S1.

Figures 3C, 3D, 3E:
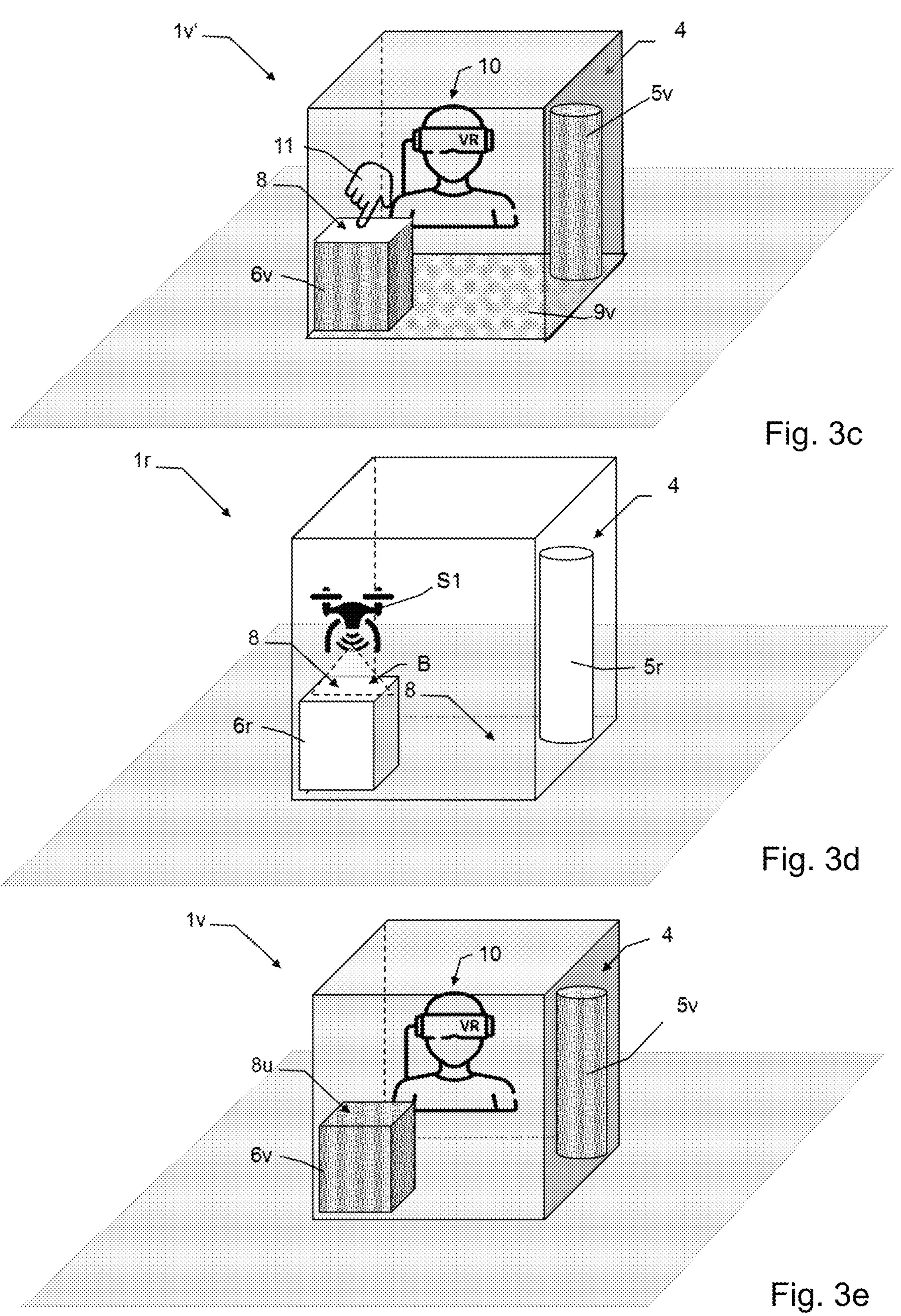

The result of the scanning procedure schematically shown in FIG. 3*b* is indicated in FIG. 3*c*, which is based on FIG. 3*a*. Here, the scan data resp. the point cloud generated by scanners S1, S2 is transferred to the VR-system as a live stream and visualized in real time as a virtual reality 1*v* to the user 10. Hence, the part of the real world 1*r* as gathered by scanning of the laser scanners S1, S2 located in this part is simulated to the user 10 with the scan data as input whereby the user 10 is in a different part of the real world, in a location remote the location of scanners S1, S2.

The visualization is schematically exemplified in FIG. 3*c* by representations 5*v*, 6*v* of the real-world objects 5*r*, 6*r* as well as indicating that the bottom area 9*v* is now representing the reality instead of being a blank, (wholly) artificial area or mock area, whereby the dotted pattern schematically represents the pattern of surface or scan points according to the scan grid. Therefore, the scan data resp. point cloud data or mesh data files are streamable and editable.

In the virtual 3D-model 1*v*' of the scanned region, the user 10 recognizes that part of the scan region is missing, namely that above mentioned upper surface 8 of object 6*v* has not been scanned (no texture but blank field). To fill this scan gap, the user 10 uses his avatar to enter a command, e.g., by pointing with a virtual hand 11 as symbolized in the figure to the surface area 8, which command triggers a further scan dedicated specifically to this missing area resp. scan gap 8.

Hence, the virtual reality model 1*v*' which visualizes in 3D the scanned environment with the user 10 having the impression of being in the environment enables to directly observe parts of the environment by the user which are missing or are not sufficient for other reasons, e.g. having a too low point density and to order a countermeasure in form of an additional, targeted scan when the scanners S1, S2 still are in the field.

In the example, the operator's marking 11 of area 8 in the virtual reality scene 1*v*' modelling the scanned environment is transferred as an order to the UAV-scanner S1 to approach the area 8 in question and perform a scan of it, as schematically shown in FIG. 3*d*. The additionally generated scan data is transmitted and added to the already existing scan data and therewith added to the point cloud file as scanned surface 8*u*. Thus, the scan gap is closed and the digital virtual reality 3D model 1*v*' dynamically updated, e.g., by updating the underlying dynamic point cloud and/or dynamic mesh, to show the surface data of the now scanned and updated upper surface 8*u* of object 6*v*, as shown in FIG. 3*e*.

Hence, the live visualization 1*v* of the scan being displayed in 3D to the user 10 provides the ability to interact with it. In addition to the pure visualization 1*v* of the scanned asset, the user 10 can be provided with additional information about each point, such as its height, its colour or any other metadata made available by the sensor capturing the data such as classification, geotagging, etc. Besides said gap filling, the interactions can be, but are not limited to, annotating, measuring, transforming (moving, scaling, rotating), as well as giving feedback to the person scanning or interacting with a scanning device in the field or remote scanner control and automatic adaption to feedback based on the live result, using automated computer vision to detect missing areas in the scan.

Figures 3F, 3G, 4:
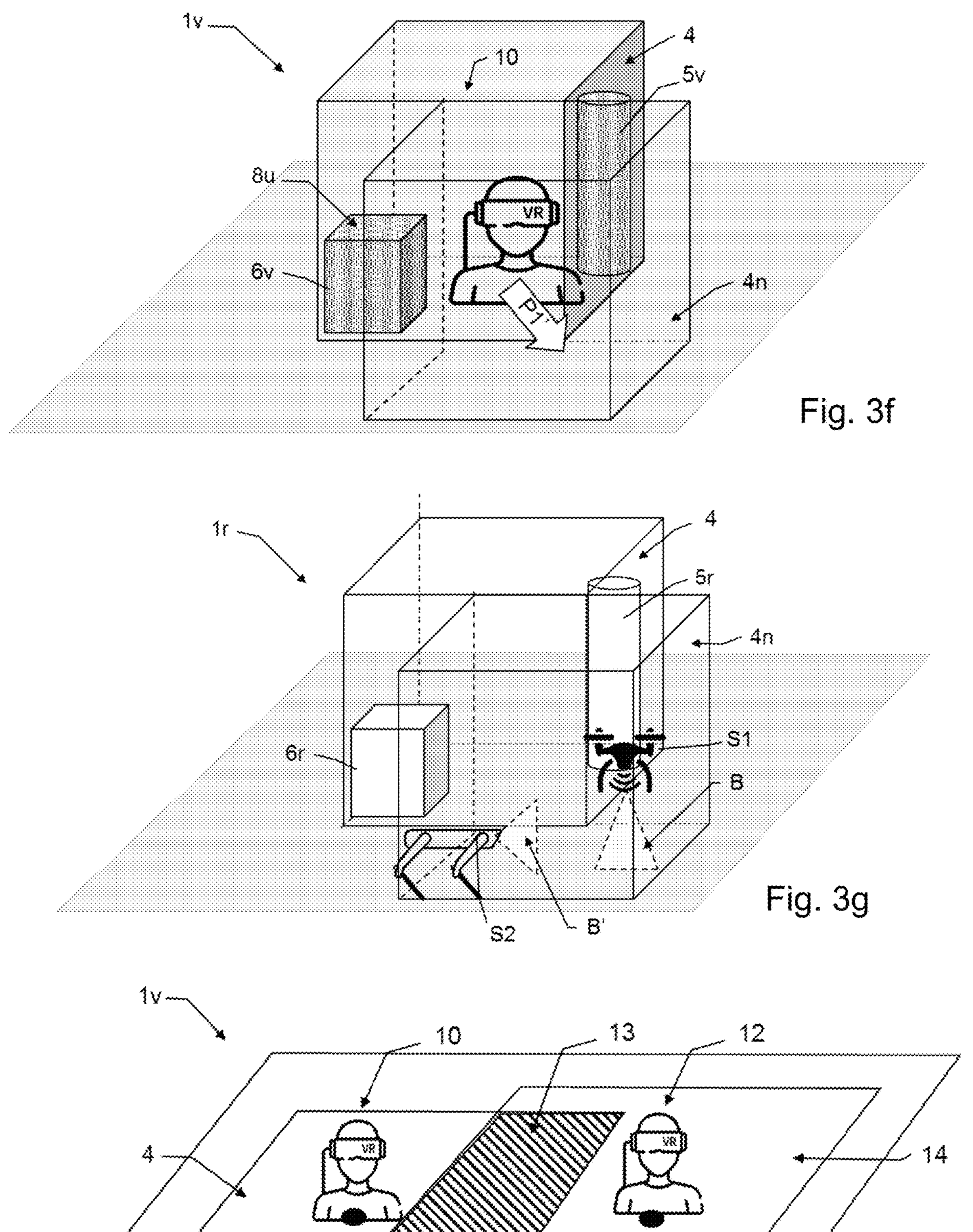
FIG. 4 schematically illustrates an application of a scanning method with multiple operators.

FIGS. 3*f* and 3*g* show schematically how the scanned volume is expanded. As indicated in FIG. 3*f*, the user resp. the avatar 10 moves in the virtual reality 1*v* from the initial position P1 to a new position P1'. This second position P1' serves as basis for defining a new volume 4*n* of the environment to be scanned, as in principle described above, e.g., position P1' being a center point of a cube 4*n*.

Data defining the additional scan volume 4*n* is transmitted to the scanners S1, S2 which move to the according volume 4*n* in the real word environment 1*r* and start to scan surfaces therein, as schematically indicated in FIG. 3*g*.

The additional scan data or point cloud data gathered by the scanning of the objects within the new scan volume 4*n* by the scanners S1, S2 as indicated in FIG. 3*g* is transmitted to the virtual reality system 1*v*. Based thereon, the additional scanned objects are simulated as in principle explained in context of FIG. 3*c* or 3*e* such that they can be additionally "viewed" by the user 10 in the VR-scene 1*v*.

A region 4, 4*n* to be scanned may not be fully limited by boundaries such as the sides/edges of cube 4, 4*n* but can be partially open. For example, only four edge points 4*e* are defined for defining a vertical area and a direction of "endless" expansion of this area in the horizontal is further set, e.g., according to the viewing direction or direction of position change (virtual walking direction) of the user 10. Thus, for example, the scanning is always ahead of a moving of a user 10.

Thereby, the above-mentioned target scan quality can be automatically differentiated according to different parameters such as object class or surface type. Such a parameter can be automatically determined or detected e.g., using camera image evaluation of images of a camera of a scanner S1, S2, e.g., machine learned object classification or feature recognition.

Also, a scan by a scanner S1, S2 can be of relatively low quality or point density in the first place such that a relatively rough detail is presented to the user 10 in the VR-scene, which can be seen as some sort of preview. The user 10 then can decide within the VR-scene which objects or areas are to be scanned in more detail and order such additional scans in the same fashion as ordering an additional scan for filling a scan gap as described in context of FIG. 3*c* above.

Hence, scan data can be refined, meaning also replaced, by additional scan data of higher point density. Thus, not only scanning gaps but also scan data of too low quality can be recognized and "healed" by scanners S1, S2 being still in the field, using the real time VR-inspection.

Such a refinement can also be executed automatically without a dedicated manual user input, e.g. in that roughly scanned objects which fall into a line of sight or walking direction of the user 10—within a certain range—in the simulation 1*v* are automatically recognized and defined by the system as (potential) regions of interest and these ROIs are then automatically approached and scanned in the real word 1*r* in high(er) resolution by a scanner S1, S2 nearby.

FIG. 4 schematically illustrates an application of the scanning method with more than one user, whereby in the example for sake of simplicity of illustration only two operators 10, 12 are depicted. The users 10, 12 can, for example, sign into a collaborative cloud-based VR-platform which provides a common digital VR-scene. A user 10 can see the position P2 of the other user 12, e.g., by a neighboring avatar on an additional general plan. As in principle described above, the position P1, P2 is automatically determined for each user 10, 12 within the scene.

Based upon the respective position P1, P2, a scanning area 4, 14 is defined. In the example, a first square 4 is defined for the first user 10 and second square 14 for the second user 14 as areas to be scanned.

In order to not only provide arbitrarily a virtual visualization of scanned object surfaces as soon as possible but to provide such surfaces which are of highest interest first, the system prioritizes areas to be scanned. In the example, an overlap 13 of the first and second scanning areas 4, 14 is determined and prioritized for scanning as therewith both users 10, 12 can be served at once with scan data relevant for each one or scan data lying within their respective area of interest 4, 14.

That is, point cloud data for the overlap scan region is first accessible to the users 12, 14. The rest of each scanning area 1, 14 is delivered or visualized afterwards.

The prioritization may be executed in that said scan region of the overlap 13 is first scanned and the rest of regions 4, 14 has lower priority and may be scanned later, which also depends on the number of available scanners in the field. Besides this option, prioritization can be implemented in that scan data for the overlap region 13 is first streamed to the VR-station and other scan data is held back and is transmitted or processed later. Thus, it can be reacted to limited bandwidth of the data connection between scanners and VR-recipient or limited processing capabilities of the VR-environment in that most important scan data is generated and/or processed first.

For example if no overlap region 13 can be determined, the separate scan regions 4, 14 may be assigned equal priority or may be prioritized depending on other parameters such as availability of scanners, role of a user 10, 12, size of area to be scanned 4, 14 or required scan quality which may differ by user 10, 12. Particularly in case of more than two users 10, 12, the number of users associated with a region to be scanned is taken into account for prioritization, e.g. regions relevant for a higher number of users 10, 12 are first scanned or streamed/processed.

Another option regarding a "smart" distribution of limited resources is to deliver scan content related to the first position P1, P2 of each user 10, 12 first before any additional scan data such as gap filling data (cf. FIGS. 3*c*-3*e*) or data relating to a second position (position P1' in FIGS. 3*f*, 3*g*) is provided. Said otherwise, the scanning system is configured in such a way that first every user 10, 12 can view a virtual representation of scanning data at his initial location P1, P2 as soon as possible before any refinement of scanned objects or expansion around the initial location P1, P2 takes place. Such a postponement of additional scan data or of an update of virtual representations until every (active) user 10, 12 is "served" at least with some live streamed scan data is in particular executed if the number of available scanners is less than the number of users 10, 12. Hence, for example any user request for gap filling or rescan as described above may be delayed according to the available technical capacities as long as another user 10, 12 still misses point cloud visualization in the VR-environment.

For example, if there are more people than scan drones, the drones are dispatched in such an order that areas 4, 14 to be scanned with the most operators 10, 12 are captured first whereby every area 4, 14 with an operator 10, 12 is assigned one scanner drone capturing it before an area 4, 14 gets assigned another drone. Further, in descending order, the other scan areas 4, 14 are captured, to provide enough data to the individual operators 10, 12 as quickly as possible. The scan drones then continue capturing the environment/object from their current location. Otherwise, the drones will simply focus on the positions P1, P2 of the users 10, 12.

Figure 5:
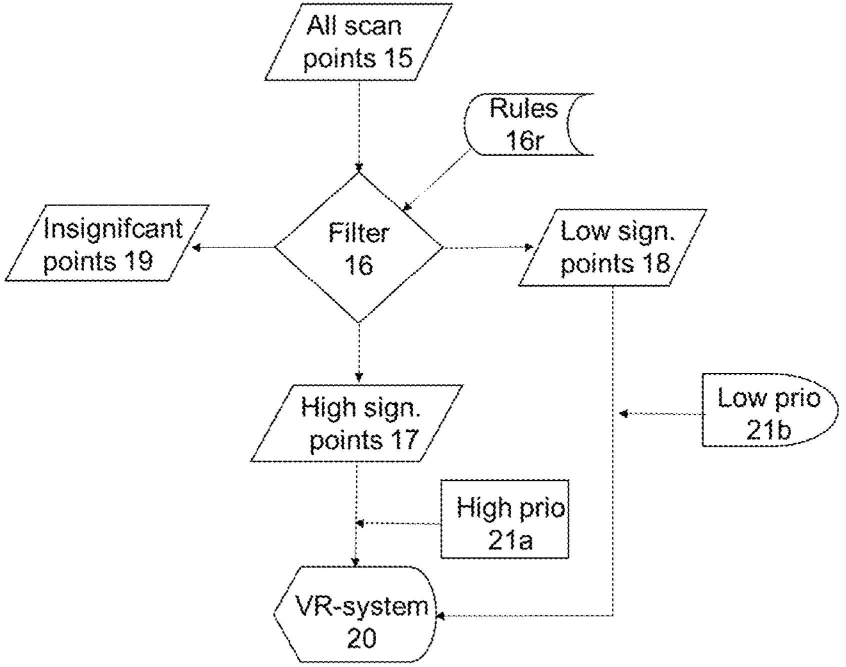
FIG. 5 illustrates a scheme scanning with consideration of technical limitations of a distributed scanning environment.

FIG. 5 illustrates another scheme for a scan method with consideration of technical limitations of a distributed scanning environment as described above. Apart from the above-described prioritization of scans as a whole, in this example, a prioritization is performed within scan data, based on scan point evaluation and filtering rules.

The set 15 of all scan points of a point cloud generated by one or more scanners is divided in real time into points 19 of no significance or junk, scan points 18 of low significance and scan points 17 of high significance by a filter 16, e.g., implemented as part of a scan algorithm of a scanner. Filter 16 evaluates point significance according to defined rules 16*r*. These rules 16*r* serve for instance for determining a base quality threshold which can be selected by operators such that scan points 19 below the threshold are sorted out. Further, outliers can be filtered out. (High) significant points 17 can be scan points of high quality whereas points of low(er) quality can be classified as low significant points 18.

Thereby, distance of a scan point can be used as an indicator of point quality, however, distance can be used as filter rule on its own in such a way that scan points within a certain measurement range are regarded as of high relevancy. Further, not only a (real) distance point to scanner can be taken into account but also the (simulated) distance point to user in the VR-scene, or more generally spoken, the viewpoint of operators is considered to determine what they are looking at to prioritize these points accordingly. Also, an average point resolution per area can be computed and considered as a filter rule 16*r*.

As another rule 16*r*, the filter 16 selects scan points which are particularly relevant for visualization as prioritized, e.g., edge points or points which are applicable for meshing. Such high significant points 17 are for example such point which allow for a rough preview of the scanning result whereas points 18 which "only" provides details are regarded as points of low significance. Optionally the remote operators can preview the point cloud based on the significant points 17 as a mesh whereby the mesh gets dynamically refined as more points are scanned or streamed.

The degree or class of significance serves as indicator for a level of priority regarding data processing, in particular streaming. That is, for example data of the high significant points 17 are of high priority 21*a* for streaming and are first transmitted, e.g., as a separate point cloud file, from the scanner or scanning system in the field to the remote VR-system 20, e.g., via a data server. Data of low significant points 18 are of low priority 21*b* and are streamed only if bandwidth allows streaming them without hindering streaming of the high significant points 17, e.g., after the set of significant points 17 is fully transmitted. The unusable or completely insignificant points 19 are not further processed resp. streamed at all, e.g., deleted or at most locally stored.

Thus, the VR-user receives and sees the most important or relevant scan results first which is in particular advantageous in case of limited data transfer connections which can happen e.g., in case of a high number of operators using the scanning system in parallel. Also, the quick accessibility of prominent scan features enables a user to quickly react to the most important information, thus improving any live feedback, e.g., by fast indication of parts of the environment resp. ROIs which the user wants to be (additionally) scanned or user indication of areas of no interest which interrupts or prevents (further) scanning of such an area.

Figure 6:
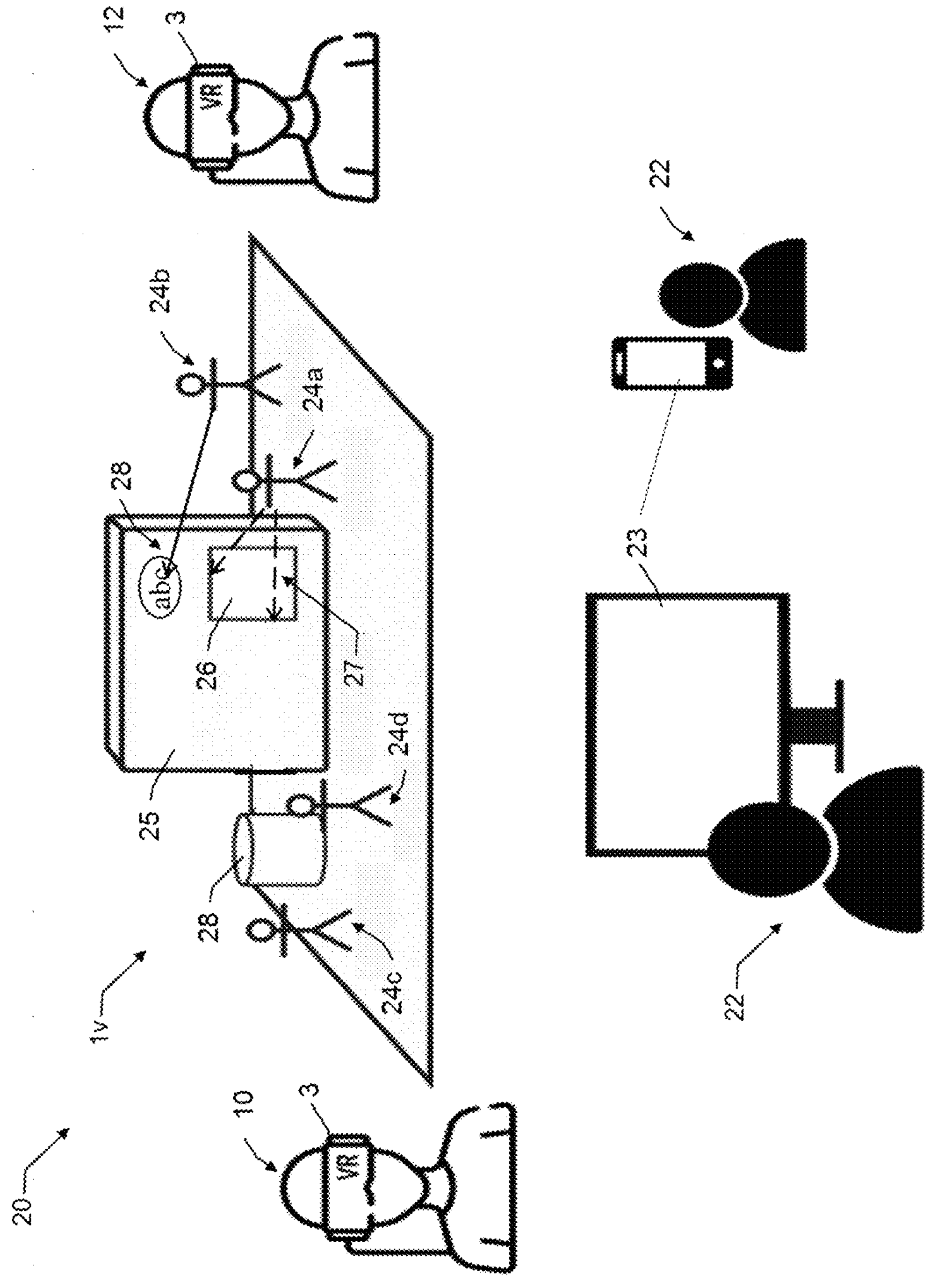
FIG. 6 depicts a scheme of a scan system for collaborative remote work based on a virtual environment with real time scan data stream.

FIG. 6 depicts a scheme of a system 20 for collaborative remote work based on a virtual environment 1*v* built on scan data streamed in real time. As already described above, multiple users 10, 12, 22*a*, 22*b* can access the VR-system 20, whereby in the example some users 10, 12 are using VR-goggles 3 for providing a more "realistic" involvement in the simulated scene whereas other users 22 use conventional display devices 23 such as a PC or a mobile device like a so called smartphone which provide just an image of the virtual environment 1*v*.

In any case, each user 10, 12, 22 is represented in the VR-scene by a respective avatar 24*a-d* which allows him to move or act virtually in the simulated world 1*v*. Thus, a user 10, 12, 22 can see a scanned object 25 which is visualized e.g., as a textured point cloud, mesh, digital twin or digital model, based on the streamed scan data from different point of views.

The VR-system 20 may also be configured to visualize each user's activities or interactions with the artificial environment to other users 10, 12, 22 e.g., a position change (moving avatar 24*a-d*) or actions such as indicating an additional scan area as described above. As another example, by avatar 24*a*, a user 10, 12, 22 may measure visualized scanned objects using their underlying real world point data. For example, as indicated in the figure, an avatar 24*a* uses a virtual length or distance meter for measuring an area 26 of object 26, indicated by arrows 27. As another example, by avatar 24*b*, a user 10, 12, 22 makes annotations by a virtual marker 28 which are accessible/visible for part of the users 10, 12 or all of them. Thus e.g., architects can undertake measurements of a scanned real building digitally modelled in the virtual environment 1*v* whereby the measurement data is delivered to a construction company.

As still another example for a user interaction, an avatar 24*c* can be used to place a virtual object 28 which is not generated based on current scan data but an object derived from a plan or from a different site objects or established purely by a user 10, 12, 22 himself, etc, whereby also temporal changes of objects 25, 28 may be simulated. Besides the visualization of a user's activity, also activities of a robot scanner or a surveyor in the real-world scanning site could be tracked and visualized in real time inside the digital reality model 1*v*.

Possible applications for such a scanning method resp. system for remote scanning with real time visualization of scanning results are the field of architecture or interior design where clients can view a space during construction, e.g., also before it is finished, whereby a targeted scan of regions of interest can be initiated from outside. Moving in virtual 3D environment 1*v* helps clients, architects, and designers to get a feeling of the dimensions of the space even from a remote location and view distinct spaces or objects on demand and simulate environment easily with different material and furniture options. A digital twin of the space can also relate to other data models to visualize the model 1*v* in different conditions that would be difficult or expensive to replicate in real-life such as different seasons, weather or climate conditions and the time of the day. 3D models can also be placed in real-world environments to simulate the view e.g., from a balcony. Additional data models, such as traffic can be added on top of the visualization to get a more accurate idea of environmental changes.

Another possible field of application is construction surveying wherein the application can be used to plan the construction on various stages of the project through a 3D representation 1*v* of a building in progress, identify potential problems, give live feedback or instructions to operators or robotic devices on the construction site based on scan data evaluation, monitor progress and visualize the results in real time. The scan measurements of the building can be inspected virtually without delay and without a need to be present in the building, which can speed up the inspection process and make it more cost-efficient. Further, it can help surveyors to more accurately assess the layout of a facility, monitor structural changes in a building on demand and identify potential hazards.

The system 20 with its 3D representations 1*v* can also offer mining surveying several advantages, such as real time surveying or monitoring of mining activities, results or outputs using remotely controlled on-site scanners, or mapping out underground cavities, for improved management of tunneling operations, or training miners in new techniques. It can also be used to create live simulations of dangerous situations, such as cave-ins or gas leaks, so that a countermeasure can be simulated and tested in advance based on real time measurement data.

A skilled person is aware of the fact that details, which are here shown and explained with respect to different embodiments, can also be combined with details from other embodiments and in other permutations.

The invention claimed is:

1. A scanning method for 3D-laser scanning of a real-world environment comprising:

providing a virtual reality scene to a first remote operator emulating at least a first part of the environment, automatically determining a first virtual position of the first remote operator within the environment, in particular using a position of the first remote operator's avatar in the virtual reality scene, automatically defining a scan region, wherein the first virtual position is used as an input parameter for defining the scan region, automatically transmitting instructions to a, in particular mobile, first scanner deployed in the environment to scan said scan region, live-streaming scan data, in particular 3D-point cloud data, of the scan region, generated by the first scanner, to the first remote operator and displaying in real-time a virtual reality 3D-view of at least part of the environment comprising the scanned scan region to the first remote operator based on the streamed scan data, automatically dynamically updating said 3D-view in real-time based on generated and live-streamed additional scan data of the environment, whereby the additional scan data expands and/or refines the scanned scan region according to:

a further virtual position of the first remote operator, in particular with a continuous automatic tracking of the first remote operator's position and according continuous automatic expanding and/or refining of the scan region, and/or an input, in particular a manual definition of a region to be additionally scanned, by the first remote operator using the displayed 3D-view within the virtual reality scene.

2. The method according to claim 1, comprising:

providing a virtual reality scene to at least a second remote operator representing at least a second part of the environment, automatically determining at least a second virtual position of the second remote operator within the environment, in particular using a position of the second remote operator's avatar in the virtual reality scene, automatically defining the scan region based on a geometric relation of said first and second virtual position.

3. The method according to claim 2, wherein the scan region is defined based on an overlap of the areas or volumes defined for the first remote operator and the second remote operator or in case no such overlap exists, separate scan regions are defined for each first remote operator and second remote operator.

4. The method according to claim 2, wherein in case multiple scan regions are defined, automatically prioritizing scan regions for scanning according to a number of first remote operators and second remote operators associated therewith.

5. The method according to claim 2, wherein generating and live-streaming of scan data is prioritized to generating and live-streaming of additional scan data at least until a virtual reality 3D-model comprising the scan region is provided to every first remote operator and second remote operator, in particular in case the number of available scanners is lower than the number of users.

6. The method according to claim 1, wherein the scan region is defined based on an area or volume of defined size with the virtual position as anchor point or as a central point.

7. The method according to claim 6, wherein for defining the size of the area or volume:

technical capabilities of a deployed scanner designated for scanning the scan region and/or operator access rights to the environment is taken into account.

8. The method according to claim 1, wherein the additional scan data is generated for refining a region having a scan resolution below a desired scan resolution, in particular for filling a scan gap.

9. The method according to claim 1, wherein the first remote operator's viewing direction is automatically determined and taken into account in the automatic defining of the scan region.

10. The method according to claim 1, wherein the scan data comprises significant points of scanned objects of the scan region which are automatically prioritized for streaming.

11. The method according to claim 10, wherein significant points are automatically defined by at least one of:

a quality threshold, a measured distance value, a calculated distance to the virtual position of the first remote operator, a usability for—at least rough—meshing, a viewing direction of the first remote operator.

12. The method according to claim 1, wherein at least a second scanner is deployed in the environment and for said automatically transmitting of scan instructions, suitability regarding location in the environment and/or capabilities of a respective scanner is automatically taken into account for automatically choosing first or second scanner for the scanning of the first scan region.

13. The method according to claim 12, wherein the scan region is automatically divided into sub-scan regions for automatic parallel scanning with multiple scanners according to the number and capabilities of available scanners.

14. The method according to claim 13, wherein generating and live-streaming of scan data is prioritized to generating and live-streaming of additional scan data at least until a virtual reality 3D-model comprising the scan region is provided to every first remote operator and second remote operator, in particular in case the number of available scanners is lower than the number of users.

15. A computer program product comprising program code, which is stored on a non-transitory machine-readable medium and having computer-executable instructions for performing, when executed on a control and evaluation computing unit of a system, the method according to claim 14.

16. A computer program product comprising program code, which is stored on a non-transitory machine-readable medium and having computer-executable instructions for performing, when executed on a control and evaluation computing unit of a system, the method according to claim 1.

17. A system for remote 3D-laser scanning of an environment comprising:

a virtual reality display for displaying virtual reality to at least a first remote operator, at least a first scanner deployed in the environment, a control and evaluation computing unit, a data connection for data transmission between the virtual reality display, the first scanner and the control and evaluation computing unit, whereby the control and evaluation computing unit is configured to:

provide a virtual reality scene to the first operator representing at least a first part of the environment, determine a first virtual position of the first remote operator within the environment, in particular using a position of the first remote operator's avatar in the virtual reality scene, define a scan region, wherein the first virtual position is used as an input parameter for defining the scan region, transmit instructions to the first scanner to scan said scan region, live-stream scan data, in particular 3D-point cloud data, of the scan region, generated by the first scanner, to the first remote operator and display in real-time a virtual reality 3D-view of at least part of the environment comprising the scanned scan region to the first remote operator based on the streamed scan data, dynamically update said 3D-view in real-time based on generated and live-streamed additional scan data of the environment, whereby the additional scan data expands and/or refines the scanned scan region according to:

a further virtual position of the first remote operator, in particular with a continuous automatic tracking of the first remote operator's position and according continuous automatic expanding and/or refining of the scan region, and/or an input, in particular a manual definition of a region to be additionally scanned, by the first operator using the displayed 3D-view within the virtual reality scene.

* * * * *